UNITED STATES PATENT OFFICE.

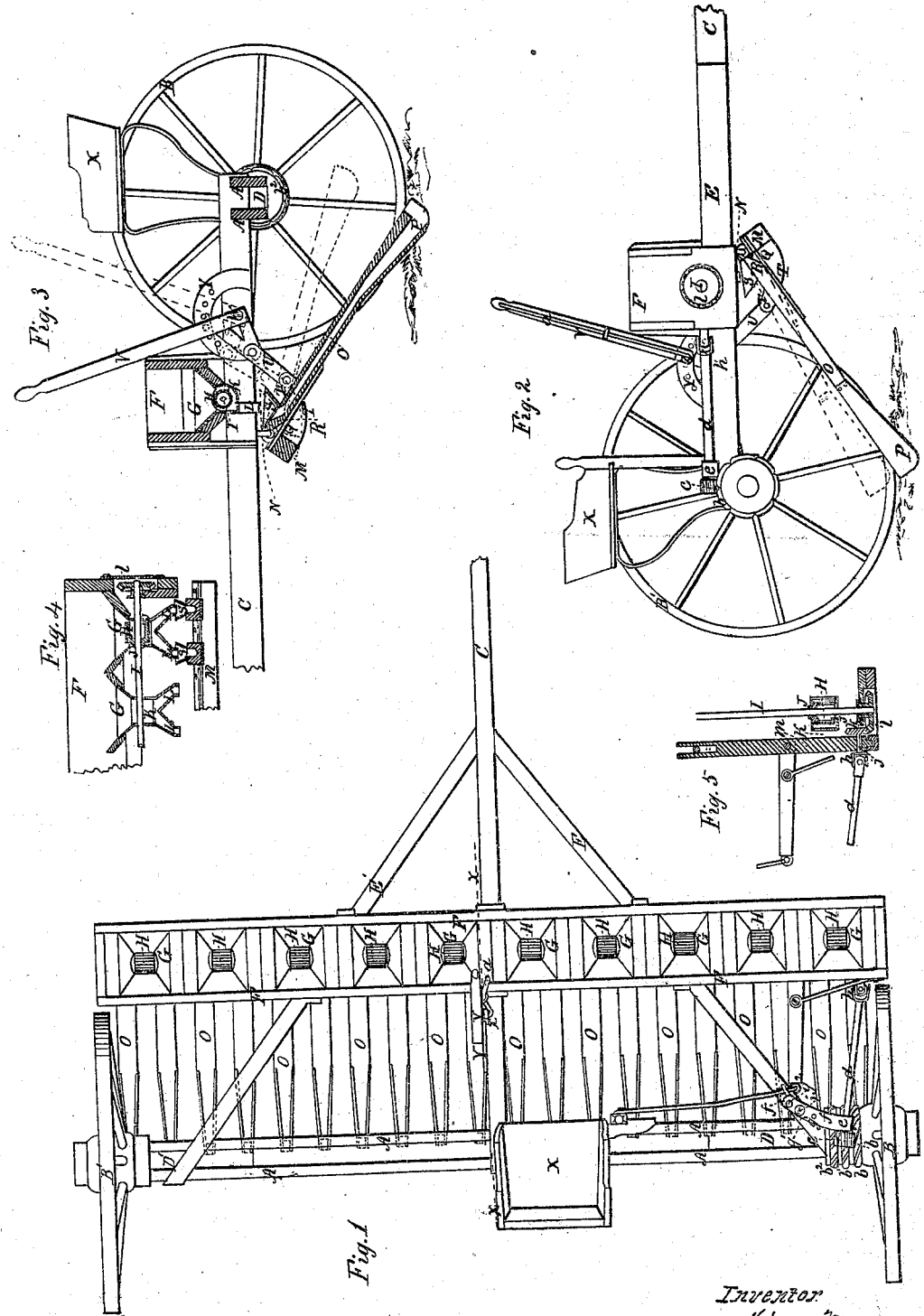

HIRAM MOORE, OF BRANDON, WISCONSIN.

IMPROVEMENT IN SEED-DRILLS.

Specification forming part of Letters Patent No. 31,819, dated March 26, 1861.

*To all whom it may concern:*

Be it known that I, HIRAM MOORE, of Brandon, in the county of Fond du Lac and State of Wisconsin, have invented certain new and useful Improvements in Seed-Drills, of which the following is a full, clear, and exact description, reference being had to the accompanying drawings, making a part of this specification, in which—

Figure 1 represents a top view or plan of my improved grain-drill. Fig. 2 represents a side elevation, the driving-wheel being removed. Fig. 3 represents a transverse section at the line $x\ x$ of Fig. 1. Fig. 4 represents a longitudinal section through two of the hoppers, &c. Fig. 5 represents a horizontal section through the end of the seed-box and bevel-gearing, showing the arrangement for throwing in and out of gear.

My improvements relate more particularly to that class of seed-drills in which the drills are so arranged as to drag behind the seed-box, and to form furrows for the seed by displacing the earth by pressure and not by plowing it up, as in most seeding-machines is the case.

The object of my said improvements is, first, the more readily and easily to press the drills into the earth to any desirable depth, and at the same time have them free to rise separately in passing over all obstructions, which often clog and sometimes break the drills now in common use, and also to raise them clear of the ground for convenience in backing the machine and in drawing it from place to place and, second, the more conveniently to alter and regulate the amount of grain or seed to be sown over a certain amount of land.

They consist, first, in a peculiar method of connecting the drills to the drill-bar and main frame of the machine; second, in a simple or complex lever caused to operate upon all the drills simultaneously by means of a drill-bar to which the lever and drills are all fastened, and through which they can be forced down to do their work or raised to any required height; third, in a peculiar arrangement of gearing upon the driving-wheel, whereby the amount of grain to be sown per acre is easily and readily regulated, as hereinafter described.

The construction of my improved seed-drill is as follows: In the drawings, A represents the main axle, carrying upon it the main supporting-wheels B B', the former of which is also the driving-wheel. C represents the reach or perch, by which the machine is connected to the front axle. It is firmly fastened to the middle of axle A, and may be pivoted to the front axle by a king-bolt, or in any convenient way. The horses may be attached directly to the perch, if desired; but it will be found preferable to employ a forward axle and wheels, with pole or shafts attached, as the horses then have not to support the weight of the machine, but merely that of the pole, while the machine is held more firmly in a forward direction.

The axle A, I prefer to make of two planks set on edge, in order to combine lightness and strength, and these planks are fastened firmly at each end to blocks D D, the outer ends of which are fashioned into journals to receive the hubs of the wheels. Diagonal braces E E' extend forward from the blocks D D', which form the ends of the axle, to the perch C, they being firmly fastened to both axle and perch. The main frame of the machine thus consists of the axle A, perch C, and diagonal braces E E'; but it may be constructed in any convenient form. Across perch and braces is arranged a long seed-box, F, as usual in seeding-machines, and in the bottom of this seed-box are arranged hoppers G G, containing toothed distributing-cylinders H H, operated by a long shaft, I, common to all the cylinders and driven by gearing from the driving-wheel, as hereinafter described. These cylinders have separate bearings J J, so that if the shaft be removed they will still retain their respective positions in the hopper, and the shaft passes loosely through them, so that it may not bind and can be taken out, and one or more of the hoppers and cylinders removed for repairs, &c., without disturbing the position of the rest. From the hoppers the grain is conducted through conduits K around the cylinders and thence to the drills by means of forked ducts or funnels L L, whereby a single hopper is caused to supply grain to two or more drills. If preferred, however, a single funnel or duct may be used, in which event a hopper becomes necessary to every drill. Beneath the seed-box and main frame is hung the drill-bar M, which is hinged to the diagonal braces on a line with the lower ends of the hopper-spout by means of hinges, as at N. It may, however, be hung in any desirable manner to the under side of the main frame. To this drill-bar are attached the drills O O, so arranged and formed as to drag or trail upon the ground in rear of the drill-bar without accumulating rubbish or becoming clogged. They are hollow tubes, as shown, and have a cutting-shoe, P, the sides of which form a sharp angle at the lower point to enter the earth more readily. The shanks of these drills are attached to the drill-bar M by spring connections Q Q, as shown, formed of steel or other suitable material, and these springs are rigidly attached at one end to the shank of the drill, and at the other end rigidly to the drill-bar for the threefold purpose: first, to prevent their moving laterally, that the seed may be planted in rows of equal distance apart; second, that the drills may be flexible up and down, and thus conform to any unevenness of the ground and move over all rubbish and other obstructions which might otherwise break or clog them; third, that by the use of a lever common to them all the drills can be forced into or raised out of the ground simultaneously. The under side of the drill-shanks are curved at their upper ends, as shown at R, in order to conform to the bend of the springs when the drills are pressed into the earth. The springs thus having something to bear against are less liable to break, have more tension, and are more apt to retain their elasticity. By means of these spring the drills, as above stated, when pressed down into the earth, are enabled separately to rise and fall to pass over obstructions without disturbing the rest, as shown by red lines in Fig. 2. Funnels S S are arranged upon the upper ends of the drills to receive the grain discharged from the hoppers through the ducts L L, and from them it passes into and down through the drill-tubes and into the furrow formed by the shoe P.

The arrangement for raising the drills and pressing them into the ground is as follows: To the drill-bar M, near its center, is firmly fastened a lever, T, composed of two arms united by a rod. A single arm may be used; but I prefer a double lever, as the strain is more equally distributed. To the rod joining these arms, or, if a single lever be be used, to its outer end, is pivoted a link, U, whose upper end is pivoted to one arm of an L-shaped lever, V, pivoted at its elbow W to the perch C of the machine, the upper end of V being within reach of the driver in his seat at X. Thus, if the driver or operator wishes to raise the drills clear of the ground, he pulls the handle of the lever V toward him. The other end of V is elevated, turning upon the pivot or fulcrum W at its elbow, and draws up the link U, which raises the end of the arm T, attached to the drill-bar. Thus, as the arm T is rigidly fastened to the drill-bar, the latter must turn upon its hinges and raise the drills. The levers, drill-bar, and drills will then be caused to assume the position shown by red lines in Fig. 3, and may be there retained by any suitable stop or catch. In the drawings a segment of a circle, Y, made of metal and having for its center the pivot W, is shown fastened to the perch C, between it and the lever V, and pierced with a number of holes. A bracket, Z, upon the lever V clasps this segment, and assists in retaining the lever in its upright position, and close to the metal segment. This bracket has a hole in it corresponding in size and distance from the pivot W with the holes in the segment Y, and into this hole fits a pin or projection at the lower end of the rod $a$, which is bent, as shown, and pivoted at or near its center to the lever V. A spring is arranged between the upper ends of lever V and rod $a$, which presses the rod away from the lever, and consequently as the rod is pivoted to the lever the pin or projection at its lower end is kept pressed into the hole in the bracket Z and into one of the holes in the metal segment X, thus retaining the lever V, and consequently the drill-bar and drills, in any required position. If their position is to be altered, the driver takes hold of the handles of both lever and rod and presses them together, thus throwing the retaining-pin out of the hole in the segment. The lever is then moved until the pin comes opposite the desired hole in the segment. When the rod $a$ is released the spring presses its upper end away from the lever V, and thus throws the pin into the hole desired, and the lever and drills are retained in their new position.

My improved arrangement of gearing to alter and regulate the amount of grain to be sown per acre is as follows: Upon the hub of one of the supporting-wheels, as B, and inside the wheel, I arrange a nest of helical gearing consisting of several series of spiral cogs, $b$ $b'$ $b^2$, of different pitch, whereby the ratio between the velocities of the pinion $c$ and of the driving-wheel B may be varied at pleasure. The pinion $c$ may be moved and held in gear with one or other of these series of cogs in any convenient way. I prefer to arrange it as shown in the drawings. The shaft $d$ of the pinion $c$ has bearings in a block, $e$, having a metal ear, $f$, fastened to it. Holes $g$ $g'$ $g^2$, corresponding in number to the number of series of spiral cogs upon the hub of the driving-wheel, are bored in this metal ear. A universal joint in the shaft $d$, at $h$, allows the pinion $c$ to be shifted to one side or other in the arc of a circle. Thus by means of a set-screw, $i$, the metal ear $f$ may be clamped fast to the diagonal brace E of the main frame and the pinion $c$ held in gear with one or other of the series of cogs, as desired. Any convenient number of these series of spiral cogs may be arranged upon the hub of the driving-wheel. As the pitch is varied the number of cogs varies also. I prefer to arrange the first, as $b$, with eight cogs, the second, $b'$, with ten, the third, $b^2$, with twelve cogs, and so on. This shaft $j$ carries upon it the bevel-pinion $k$, gearing with the bevel-wheel $l$ upon the cylinder-shaft I, and it has a bearing in a sliding bar, $m$, which by a suitable combination of levers is caused to slide back and forth by the driver in his seat X, carrying with it the bevel-pinion $k$, and thus throwing it into and out of gear with the bevel-wheel $l$. By thus throwing these bevel-wheels out of gear the machine can be moved from place to place without operating the cylinders, and consequently without distributing any grain.

When the machine is to be used the seedbox F is filled with grain or seed to be sown. The amount to be sown per acre is determined by setting the pinion $c$ in gear with one or other of the series of spiral cogs $b$ $b'$ $b^2$ upon the hub of the driving-wheel B. The bevel-pinion $k$ and bevel-wheel $l$ are thrown out of gear, and the drills are raised clear of the ground by means of lever V into the position shown by red lines in Fig. 3, and the machine is then ready to be drawn to the field. Upon arriving at the field where the grain is to be sown the drills are lowered and pressed down by lever T to penetrate the surface of the ground to any desired depth, the bevel-pinion $k$ and wheel $l$ are thrown into gear, and the machine is started. The cylinders H, revolving, move the grain through the conduits K to the funnels or ducts L L, and by them it is delivered to the drills O O and deposited in the furrows made by the drill-shoes P.

Having thus described the construction and mode of operation of my improved grain-drill, what I claim therein as new, and desire to secure by Letters Patent, is—

1. The combination of a hinged drill-bar, a series of rigid-shank trailing drills, and a corresponding series of springs to connect the shanks and bar, so that by turning the latter the drills may be pressed with more or less force into the surface of the ground, (as the ground is harder or softer or a deeper or shallower furrow is required,) or may be lifted above the surface, substantially as described.

2. A series of trailing drills having rigid shanks connected to a hinged drill-bar by springs that will resist lateral flexure to maintain the relative distances of the drills apart, while free to flex upward and downward to enable the drills severally to conform to uneven surfaces, substantially as described.

3. Curves at the upper ends of the drill-shanks, as shown at R, in combination with the springs, substantially as and for the purposes set forth.

4. A lever, in combination with the hinged drill-bar and a series of trailing drills connected to the bar by springs, the arrangement of these parts being such that by turning the lever all the drills will be simultaneously forced into the earth or raised therefrom, and when forced into the earth the shank of each drill throughout its entire length will still be left free to play up and down to the extent which the elasticity of the spring will permit to allow the drill to pass over obstructions and to conform to inequalities of the surface, substantially as described.

5. Arranging the mouths of the conduits on the drill-shanks as nearly as may be in the line of the axis of motion of the hinged drill-bar, so that raising and lowering the drills will change as little as may be the positions of the mouths of the conduits on the drill-shanks relative to the positions of the lower ends of the hopper-spouts, substantially as described.

6. The combination of a removable driving-shaft with a series of seeding-cylinders having independent bearings, whereby said shaft can at pleasure be removed to allow any of said cylinders to be taken out for repairs without displacing the rest, substantially as described.

7. A series of helical gear having teeth of varying number and pitch, in combination with a shifting pinion, for purposes substantially as described.

In testimony whereof I have hereunto subscribed my name.

HIRAM MOORE.

Witnesses:
JOSEPH H. POST,
R. C. KELLY.